United States Patent
Kim et al.

(10) Patent No.: US 10,201,779 B2
(45) Date of Patent: Feb. 12, 2019

(54) DEHUMIDIFYING AND HUMIDIFYING DEVICE

(71) Applicant: INDUSTRY-UNIVERSITY COOPERATION FOUNDATION HANYANG UNIVERSITY ERICA CAMPUS, Ansan-Si, Gyeonggi-do (KR)

(72) Inventors: Youngdeuk Kim, Ansan-si (KR); Wooseung Kim, Seoul (KR)

(73) Assignee: INDUSTRY-UNIVERSITY COOPERATION FOUNDATION HANYANG UNIVERSITY ERICA CAMPUS, Ansan-Si, Gyeonggi-do (KR)

( * ) Notice: Subject to any disclaimer, the term of this patent is extended or adjusted under 35 U.S.C. 154(b) by 53 days.

(21) Appl. No.: 15/502,293

(22) PCT Filed: Jul. 21, 2015

(86) PCT No.: PCT/KR2015/007560
§ 371 (c)(1),
(2) Date: Feb. 7, 2017

(87) PCT Pub. No.: WO2016/021850
PCT Pub. Date: Feb. 11, 2016

(65) Prior Publication Data
US 2017/0232385 A1    Aug. 17, 2017

(30) Foreign Application Priority Data

Aug. 7, 2014   (KR) .................. 10-2014-0101829
Nov. 21, 2014  (KR) .................. 10-2014-0163802

(51) Int. Cl.
*B01D 53/22*  (2006.01)
*B01D 53/26*  (2006.01)
(Continued)

(52) U.S. Cl.
CPC ......... *B01D 53/268* (2013.01); *B01D 53/263* (2013.01); *B01D 53/265* (2013.01);
(Continued)

(58) Field of Classification Search
CPC ....... F24F 3/14; B01D 61/364; B01D 53/268; B01D 53/265; B01D 53/22; B01D 53/26
See application file for complete search history.

(56) References Cited

U.S. PATENT DOCUMENTS

| 1,808,982 A | * | 6/1931 | Harris | ..................... F24F 3/147 |
| | | | | 261/DIG. 34 |
| 2,290,465 A | * | 7/1942 | Crawford | .............. F24F 3/1417 |
| | | | | 165/224 |

(Continued)

FOREIGN PATENT DOCUMENTS

| JP | 11-051421 | 2/1999 |
| JP | 2013-064550 | 4/2013 |

(Continued)

*Primary Examiner* — Anthony R Shumate
(74) *Attorney, Agent, or Firm* — Finch & Maloney PLLC

(57) ABSTRACT

A dehumidifying and humidifying apparatus is provided. The dehumidifying and humidifying apparatus includes a first exchange part in which steam is exchanged between a first fluid and external air due to a difference between partial pressures of the first fluid and the external air, and a heat exchange unit configured to supply the first fluid having a first partial pressure to the first exchange part and receive the first fluid having a second partial pressure that is different from the first partial pressure from the first exchange part.

19 Claims, 10 Drawing Sheets

(51) Int. Cl.
 *F24F 3/14* (2006.01)
 *F24F 3/153* (2006.01)
 *B01D 61/36* (2006.01)
 *F24F 13/30* (2006.01)

(52) U.S. Cl.
 CPC .............. *B01D 61/364* (2013.01); *F24F 3/14* (2013.01); *F24F 3/153* (2013.01); *B01D 2313/38* (2013.01); *B01D 2317/02* (2013.01); *F24F 13/30* (2013.01)

(56) References Cited

U.S. PATENT DOCUMENTS

| | | | | |
|---|---|---|---|---|
| 5,218,833 | A * | 6/1993 | Newbold | F24F 3/044 261/104 |
| 5,985,005 | A * | 11/1999 | Mizobe | B01D 53/268 55/360 |
| 6,309,448 | B1 * | 10/2001 | Mizobe | B01D 53/268 55/467.1 |
| 6,610,122 | B1 * | 8/2003 | Filburn | B01D 53/04 95/139 |
| 7,819,943 | B2 * | 10/2010 | Weidmann | B01D 53/268 95/45 |
| 2004/0134210 | A1 * | 7/2004 | Yabu | B01D 53/0415 62/271 |
| 2004/0262408 | A1 * | 12/2004 | Yabu | F24F 3/1411 236/44 C |
| 2005/0279209 | A1 * | 12/2005 | Matsunaga | B01D 53/22 96/10 |
| 2010/0308480 | A1 * | 12/2010 | Suzuki | B01D 53/22 261/74 |
| 2011/0185752 | A1 | 8/2011 | Holzner | |
| 2011/0200850 | A1 * | 8/2011 | Gottwick | H01M 8/04014 429/9 |
| 2013/0298590 | A1 | 11/2013 | Heinzl | |
| 2014/0360367 | A1 * | 12/2014 | Ahn | B01D 63/08 95/45 |
| 2014/0374929 | A1 * | 12/2014 | Fujita | F28D 21/0015 261/129 |

FOREIGN PATENT DOCUMENTS

| | | |
|---|---|---|
| KR | 2003-0064726 | 8/2003 |
| KR | 10-0801715 | 2/2008 |
| KR | 10-0834191 | 5/2008 |
| KR | 10-2009-0108250 | 10/2009 |
| KR | 10-2011-0060518 | 11/2009 |
| WO | 2010006968 A1 | 1/2010 |
| WO | 2012055477 A1 | 5/2012 |

\* cited by examiner

DEHUMIDIFYING AND HUMIDIFYING DEVICE

THE NAMES OF THE PARTIES TO A JOINT RESEARCH AGREEMENT

This work was supported by the Basic Science Research Program through the National Research Foundation of Korea (NRF) funded by the Ministry of Education (NRF-2017R1D1A1B03035821). This work was also supported by the Korea Institute of Energy Technology Evaluation and Planning (KETEP) funded by the Ministry of Trade, Industry and Energy (MOTIE) of the Republic of Korea (No. 20174010201310).

BACKGROUND

1. Field

Embodiments of the inventive concepts relate to a dehumidifying and humidifying apparatus, and more particularly to a dehumidifying and humidifying apparatus that includes an exchange part in which vapor is exchanged between fluid and external air, and a heat exchange unit for adjusting a temperature (partial pressure) of the fluid.

2. Description of the Related Art

If the humidity of air increases, various phenomena such as decomposition, corrosion, and water condensation occur and odors and bacteria are also generated, so homes, hospitals, electrical equipment, communication equipment, and various electrical devices require an apparatus for removing moisture.

A conventional dehumidifying apparatus includes a refrigerating cycle mainly using a refrigerant gas such as CFG. However, the dehumidifying apparatus causes environmental problems, and the compressor used in the dehumidifying apparatus has a complex structure, such as an evaporator, a condenser, and a compressor, causes noise, vibration, and very high power consumption, and occupies a large installation space. Further, the heat generated during the driving of the compressor shortens the life span of the dehumidifying apparatus.

SUMMARY

The inventive concept provides a dehumidifying and humidifying apparatus of a simple structure.

The inventive concept also provides a dehumidifying and humidifying apparatus having an improved dehumidifying and humidifying efficiency.

The inventive concept also provides a dehumidifying and humidifying apparatus that may simultaneously or selectively perform dehumidifying and humidifying operations with one apparatus.

The inventive concept also provides a dehumidifying and humidifying apparatus having reduced power consumption.

The inventive concept also provides a dehumidifying and humidifying apparatus that minimizes generation of heat.

The objects of the inventive concept are not limited to the above-described ones.

In order to solve the technical objects, the inventive concept provides a dehumidifying apparatus.

According to an embodiment, a dehumidifying apparatus may include a first membrane distillation unit having a separator partitioning a first passage through which introduced external air flows and a second passage through which a first fluid flows, wherein vapor contained in the external air passes through the first separator and is separated to the second passage, a second membrane distillation unit having a second separator partitioning a third passage through which the first fluid discharged from the second passage flows and a fourth passage through which a second fluid flows, wherein steam generated from the first fluid passes through the second separator and is separated to the fourth passage, a thermoelectric element having a heat absorbing surface and a heat emitting surface, and a first fluid circulation line through which the first fluid discharged from the second passage is introduced into the third passage via the heat emitting surface and through which the first fluid discharged from the third passage is reintroduced into the second passage via the heat absorbing surface.

According to an embodiment, the dehumidifying apparatus may further include a buffer tank installed in the first fluid circulation line in a zone between the second passage and the heat emitting surface, and a pump installed in the first fluid circulation line in a zone between the buffer tank and the heat emitting surface.

According to an embodiment, the dehumidifying apparatus may further include a second fluid circulation line through which the second fluid discharged from the fourth passage is reintroduced into the fourth passage via the heat absorbing surface, a buffer tank provided on the second fluid circulation line in a zone between the fourth passage and the heat absorbing surface and configured to accommodate the second fluid discharged from the fourth passage, and a second fluid storage tank connected to the buffer tank through a supply line and configured to store the second fluid contained in the buffer tank.

According to an embodiment, the heat absorbing surface may cool the first fluid introduced into the second passage, and the heat emitting surface may heat the first fluid introduced into the third passage.

In order to solve the technical objects, the inventive concept provides a dehumidifying method.

According to an embodiment, a dehumidifying method may include passing vapor contained in external air through a first separator of a first membrane distillation unit such that the vapor is condensed in a first fluid, introducing the first fluid discharged from the first membrane distillation unit into a second membrane distillation unit via a heat emitting surface of a thermoelectric element, passing steam of the first fluid generated from a surface of a second separator of the second membrane distillation unit through the second separator such that the steam is condensed in a second fluid, and reintroducing the first fluid discharged from the second membrane distillation unit into the first membrane distillation unit via a heat absorbing surface of the thermoelectric element.

According to an embodiment, the first fluid may be cooled by the heat absorbing surface of the thermoelectric element, and the first fluid may be heated by the heat emitting surface of the thermoelectric element.

According to an embodiment, a portion of the second fluid discharged from the second membrane distillation unit may be reintroduced into the second membrane distillation unit after being cooled via the heat absorbing surface of the thermoelectric element, and the remaining portion of the second fluid discharged from the second membrane distillation unit may be introduced into a second fluid storage tank.

In order to solve the technical objects, the inventive concept provides a dehumidifying and humidifying apparatus.

According to an embodiment, a dehumidifying and humidifying apparatus may include a first exchange part in which steam is exchanged between a first fluid and external air due to a difference between partial pressures of the first fluid and the external air, and a heat exchange unit configured to supply the first fluid having a first partial pressure to the first exchange part and receive the first fluid having a second partial pressure that is different from the first partial pressure from the first exchange part According to an embodiment, the second partial pressure may be higher than the first partial pressure and steam of the external air may flow to the first fluid in the first exchange part.

According to an embodiment, the dehumidifying and humidifying apparatus may further include a second exchange part configured to receive the first fluid having a third partial pressure that is higher than the second partial pressure from the heat exchange unit, and supply the first fluid having a fourth partial pressure that is lower than the third partial pressure to the heat exchange unit.

According to an embodiment, the heat exchange unit may change a partial pressure of the first fluid having the fourth partial pressure, which has been supplied from the second exchange part, to the first partial pressure that is lower than the fourth partial pressure, and may supply the first fluid having the first partial pressure to the first exchange part.

According to an embodiment, the second exchange part may exchange steam between a second fluid having a fifth partial pressure that is lower than the third partial pressure supplied from the heat exchange unit and the first fluid having the third partial pressure, and may supply the second fluid having a sixth partial pressure that is higher than the fifth partial pressure to the heat exchange unit.

According to an embodiment, the heat exchange unit may change a partial pressure of the second fluid having the sixth partial pressure, which has been supplied from the second exchange part, to the fifth partial pressure, and may supply the second fluid having the fifth partial pressure to the second exchange part.

According to an embodiment, the dehumidifying and humidifying apparatus may further include a third exchange part in which steam is exchanged between a third fluid and the external air.

According to an embodiment, the heat exchange unit may supply the third fluid having a seventh partial pressure to the third exchange part, and may receive the third fluid having an eighth partial pressure that is lower than the seventh partial pressure from the third exchange part.

According to an embodiment, the third exchange part may be disposed in a space that is different from the first exchange part.

According to an embodiment, the second partial pressure may be lower than the first partial pressure and steam of the first fluid may flow to the external air in the first exchange part.

According to an embodiment, the first exchange part may include a membrane distillation unit.

According to an embodiment, the heat exchange part may adjust a partial pressure of the first fluid by adjusting a temperature of the first fluid.

According to an embodiment, the heat exchange unit may include a thermoelectric element.

According to an embodiment of the inventive concept, because the dehumidifying and humidifying apparatus does not employ an evaporator, a condenser, and a compressor employed in the related art but employs a membrane evaporation unit and a thermoelectric element for dehumidification and humidification, the structure of the dehumidifying and humidifying apparatus is simple.

Further, according to the inventive concept, because the thermoelectric element consumes less electric power than an evaporator, a condenser, and a compressor according to the related art, the dehumidifying and humidifying apparatus consumes less electric power.

Further, according to the inventive concept, because a difference between partial pressures of the fluids introduced into the membrane evaporation units is large, the vapor included in external air may be effectively removed.

Further, according to the inventive concept, because the heat generated by the thermoelectric element is used to heat the first fluid and is restrained from being emitted to the outside, generation of heat during driving of the dehumidifying and humidifying apparatus is restrained.

Further, according to the inventive concept, dehumidification and humidification may be performed selectively or simultaneously.

DETAILED DESCRIPTION OF THE EMBODIMENTS

Figure 1:
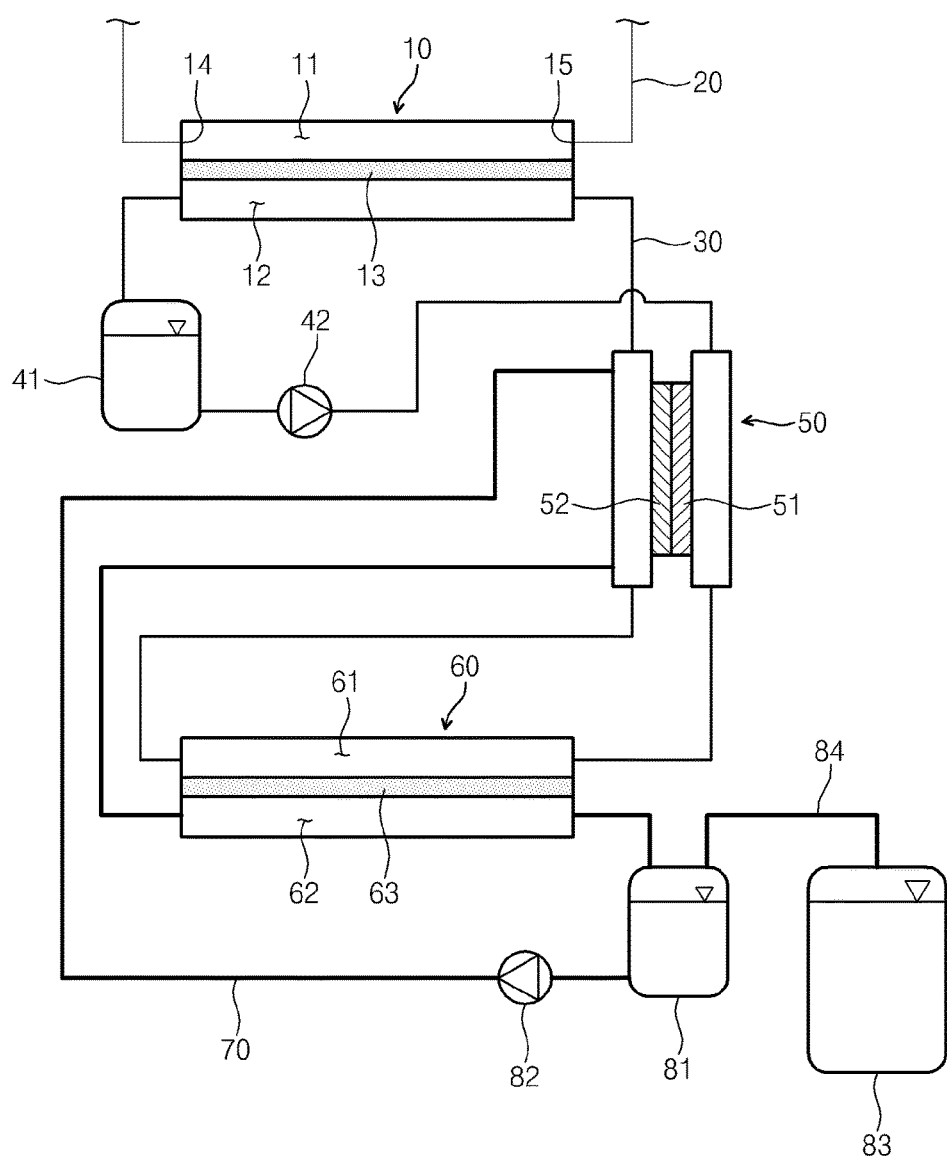
FIG. 1 is a view schematically illustrating a dehumidifying apparatus according to a first embodiment of the inventive concept.

Hereinafter, preferred embodiments of the inventive concept will be described in detail with reference to the accompanying drawings. However, the technical spirit of the inventive concept is not limited to the embodiments, but may be realized in different forms. The embodiments introduced here are provided to sufficiently deliver the spirit of the inventive concept to those skilled in the art so that the disclosed contents may become thorough and complete.

Further, in the drawings, the thicknesses of the membrane and areas are exaggerated for efficient description of the technical contents. Further, in the various embodiments of the inventive concept, the terms such as first, second, and third are used to describe various elements, but the elements are not limited to the terms. The terms are used only to distinguish one element from another element. Accordingly, an element mentioned as a first element in one embodiment may be mentioned as a second element in another embodiment. The embodiments illustrated here include their complementary embodiments. Further, the term "and/or" in the specification is used to include at least one of the elements enumerated in the specification.

In the specification, the terms of a singular form may include plural forms unless otherwise specified. Further, the terms "including" and "having" are used to designate that the features, the numbers, the steps, the elements, or combinations thereof described in the specification are present, and may be understood that one or more other features, numbers, steps, elements, or combinations thereof may be added. Further, in the specification, "connected to" is used to mean a plurality of elements are indirectly or directly connected to each other.

Further, in the following description of the inventive concept, a detailed description of known functions and configurations incorporated herein will be omitted when it may make the subject matter of the inventive concept unnecessarily unclear.

A dehumidifying apparatus according to a first embodiment of the inventive concept will be described.

FIG. 1 is a view schematically illustrating a dehumidifying apparatus according to a first embodiment of the inventive concept.

Referring to FIG. 1, the dehumidifying apparatus 100 include a first membrane distillation unit 10, an air passage 20, a first fluid circulation passage 30, a first buffer tank 41, a first pump 42, a thermoelectric element 50, a second membrane distillation unit 60, a second fluid circulation passage 70, a second buffer tank 81, a second pump 82, and a second fluid storage tank 83.

The first membrane distillation unit 10 separates and condenses vapor included in external air. The first membrane distillation unit 10 has a first passage 11, a second passage 12, and a first separator 13.

The first passage 11 is connected to the air passage 20. The external air introduced through an inlet 14 flows along the first passage 11 and is discharged through an outlet 15. For compulsory blowing of the external air, a pan or a pump (not illustrated) may be provided on the air passage 20.

The second passage 12 is connected to the first fluid circulation passage 30, and a first fluid flows through the second passage 12. According to an embodiment, the first fluid may flow along the second passage 12 in a direction that is opposite to a flow direction of the external air in the first passage 11. Further, according to another embodiment, the first fluid may flow in a direction that is the same as the flow direction of the external air in the first passage 11. Further, according to another embodiment, the first passage 11 may flow in a direction that crosses the flow direction of the external air in the first passage 11.

The first fluid flowing through the second passage 12 may have a partial pressure that is lower than that of the external air flowing through the first passage, or the first fluid may include water containing a drying agent and/or may have a temperature that is lower than that of the external air flowing through the first passage. Accordingly, steam (for example, vapor) contained in the external air flowing through the first passage may pass through the separator 13 and may be absorbed by the first fluid flowing through the first passage 12.

According to an embodiment, the drying agent contained in the first fluid is dissolved in water and a material that may absorb moisture is used as the drying agent. The drying agent may include an oxide such as calcium oxide (CaO) or phosphorus pentoxide ($P_2O_5$), an acid or a base such as concentrated sulfuric acid or sodium hydroxide, and a metal such as metallic sodium. According to an embodiment, lithium chloride (LiCl) is used as the drying agent. The drying agent is not limited thereto, but various materials having the above-mentioned properties may be used.

The first separator 13 is a porous hydrophobic membrane, and is divided into the first passage 11 and the second passage 12. The first separator 13 may include a polymeric membrane such as polytetrafluoroethylene (PTEE), polypropylene (PP), polyvinylidene fluoride (PVDF), and polyethylene (PE). According to an embodiment, the first separator 13 may be a single membrane. Further, according to another embodiment, the first separator 13 may be a multilayered membrane in which a hydrophobic membrane and a hydrophilic membrane are stacked. The first separator 13 included in the dehumidifying apparatus 100 according to the first embodiment of the inventive concept is not limited in aspects of materials, types, and forms. The vapor contained in the external air passes through the first separator 13 to be separated towards the second passage 12, and is condensed by the first fluid.

The first membrane distillation unit 10 may be any one of a plate and frame module, a hollow fiber module, a tubular membrane module, and a spiral wound membrane module. A passage of the plate and frame module is classified as a plate type separator. In the hollow fiber module, a plurality of very thin hollow fiber separators are provided in one cylindrical shell tube. In the tubular membrane module, a tubular separator is located between two inner and outer cylindrical chambers. The spiral wound membrane module is a module in which a flat sheet-shaped separator is wound by a spacer and a water collection pipe having a hole at the center thereof is produced.

The first fluid circulation passage 30 is a passage through which the first fluid circulates, and is connected to the second passage 12 of the first membrane distillation unit 10. The first buffer tank 41, the first pump 42, a heat emitting surface 51 of the thermoelectric element 50, a third passage 61 of the second membrane distillation unit 60, and a heat absorbing surface 52 of the thermoelectric element 50 may be sequentially provided on the first fluid circulation passage 30 from the second passage 12 in the flow direction of the first fluid.

The first buffer tank 41 is temporarily filled with the first fluid discharged from the second passage 12. The first pump 42 sends the first fluid filled in the first buffer tank 41 to the heat emitting surface 51 of the thermoelectric element 50. Because the first buffer tank 41 is always filled with the first fluid corresponding to a predetermined amount or more, generation of an overload of the first pump 42 is prevented.

The thermoelectric element 50 has the heat emitting surface 51 and the heat absorbing surface 52, and the heat emitting surface 51 and the heat absorbing surface 52 are connected to the first fluid circulation passage 30. The heat emitting surface 51 transfers heat to the first fluid discharged from the first buffer tank 41 and introduced to the third passage 61 of the second membrane distillation unit 60 to increase a temperature of the first fluid. The heat absorbing surface 52 absorbs heat from the first fluid discharged from the third passage 61 and introduced into the second passage 12 to decrease the temperature of the first fluid.

The second membrane distillation unit 60 separates moisture from the first fluid. The second membrane distillation unit 60 has a third passage 61, a fourth passage 62, and a second separator 63.

The third passage 61 is connected to the first fluid circulation passage 30, and the fourth passage 62 is connected to the second fluid circulation passage 70. According to an embodiment, a flow direction of the first fluid in the third passage 61 and a flow direction of the second fluid in the fourth passage 62 may be opposite to each other. Further, according to another embodiment, a flow direction of the first fluid in the third passage 61 and a flow direction of the second fluid in the fourth passage 62 may be opposite to each other. Further, according to another embodiment, a flow direction of the first fluid in the third passage 61 and a flow direction of the second fluid in the fourth passage 62 may cross each other.

The second separator 63 is a porous hydrophobic membrane, and is divided into the third passage 61 and the fourth passage 62. The second separator 63 may be formed of the same material as that of the first separator 13 in the same form.

Moisture is evaporated from the first fluid flowing through the third passage 61 on a boundary surface of the second separator 63, and the generated vapor passes through the second separator 63 due to a difference of partial pressures, is separated to the fourth passage 62, and is condensed. According to an embodiment, the second fluid is water, and the condensed vapor is mixed with the second fluid.

The second membrane distillation unit 60 may be a module that is the same as the above-described first membrane distillation unit 10.

The second fluid circulation passage 70 is a passage through which the second fluid circulates, and is connected to the fourth passage 62 of the second membrane distillation unit 60. The second buffer tank 81, the second pump 82, and the heat absorbing surface 52 of the thermoelectric element 50 are sequentially provided on the second fluid circulation passage 70 from the fourth passage 62 in the flow direction of the second fluid.

The second buffer tank 81 is temporarily filled with the second fluid discharged from the fourth passage 62. The second pump 82 sends the second fluid filled in the second buffer tank 81 to the heat emitting surface 52 of the thermoelectric element 50. Because the second buffer tank 81 is always filled with the second fluid corresponding to a predetermined amount or more, generation of an overload of the second pump 82 is prevented. If the second fluid corresponding to a predetermined level or more is filled in the second buffer tank 81, the second fluid is fed through the supply line 84 and is delivered to the second fluid storage tank 83.

Hereinafter, a dehumidifying method using the dehumidifying apparatus according to the first embodiment of the inventive concept will be described in detail.

Figure 2:
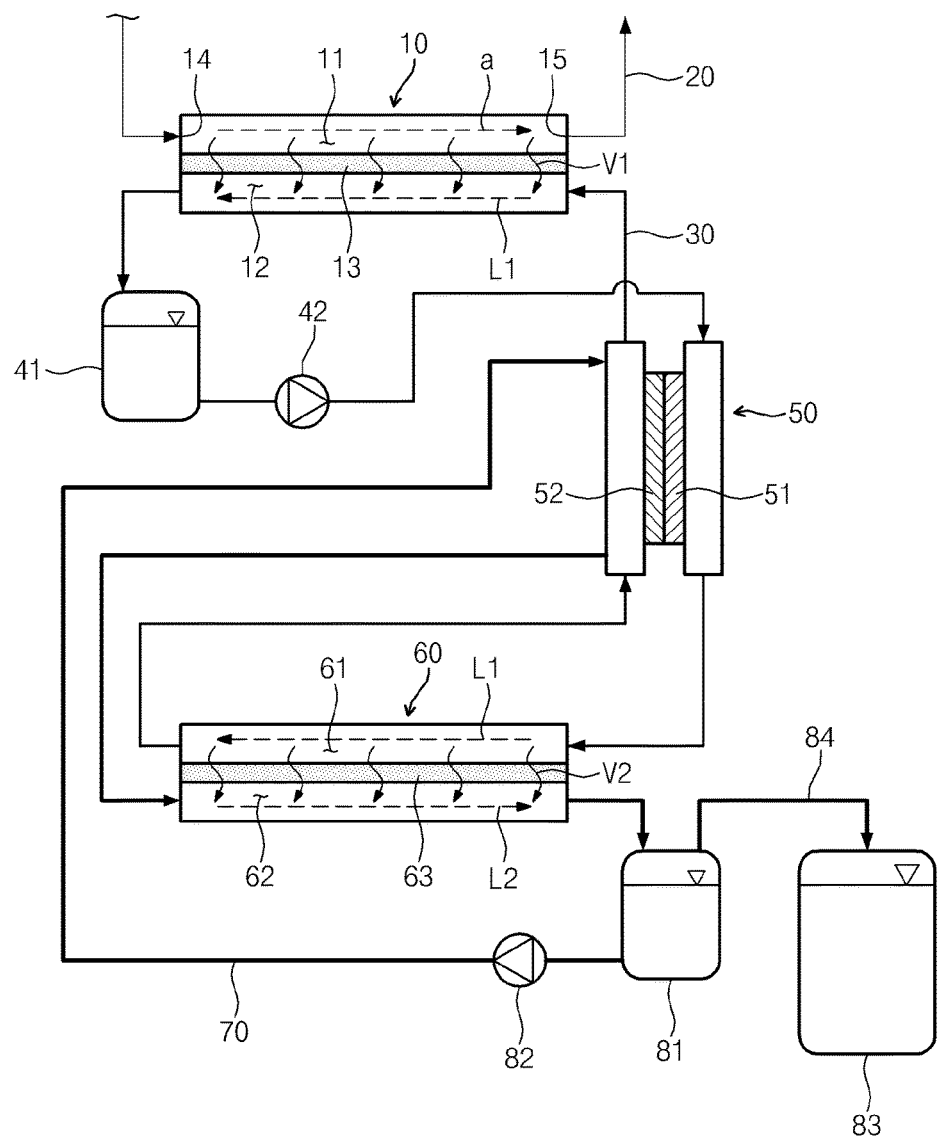
FIG. 2 is a view illustrating a driving process of the dehumidifying apparatus of FIG. 1.

FIG. 2 is a view illustrating a driving process of the dehumidifying apparatus of FIG. 1. Although FIG. 2 illustrates that external air and a first fluid and the first fluid and a second fluid flow in opposite directions, as illustrated in FIG. 1, the external air and the first fluid and the first fluid and the second fluid may flow in the same direction or in directions that cross each other.

Referring to FIG. 2, external air a is introduced into the first passage 11 of the first membrane distillation unit 10 through the air passage 20 through driving of the pan or the pump (not illustrated). In a process in which the external air a flows through the first passage 11, the vapor V1 contained in the external air a passes through the pores of the first separator 13 and is separated to the second passage 12. In this case, as a difference between the partial pressures of the exterior air a and the first fluid L1 increases, an amount of the vapor V1 separated to the second passage 12 also increases. After the vapor V1 is removed, the external air a is discharged to the outside through the air passage 20. The vapor V1 is condensed by the first fluid L1 flowing along the second passage 12. The vapor V1 is mixed with the first fluid L1, and the temperature of the first fluid L1 gradually increases due to the latent heat of the vapor V1 as it goes from the inlet of the second passage 12 towards the outlet of the second passage 12.

The first fluid L1 flows along the first fluid circulation passage 30 and is temporarily stored in the first buffer tank 41, and flows to the heat emitting surface 51 of the thermoelectric element 50 through driving of the first pump 42. The heat transferred from the heat emitting surface 51 is transferred to the first fluid L1, and the temperature of the first fluid L1 increases.

The first fluid L1 is introduced into the third passage 61 of the second membrane distillation unit 60 along the first fluid circulation passage 30, and flows from the inlet of the third passage 61 to the outlet of the third passage 61. The second fluid L2 flows from the inlet of the fourth passage 62 to the outlet of the fourth passage 62. In this process, the water contained in the first fluid L1 is evaporated on a boundary surface of the second separator 63, and the vapor V2 passes through the second separator 63 due to a difference of partial pressures, is separated to the fourth passage 62, and is condensed by the second fluid L2. The temperature of the first fluid L1 gradually decreases as it goes from the inlet of the third passage 61 to the outlet of the third passage 61 due to loss of heat caused by flows of the vapor V2, and the temperature of the second fluid L2 gradually increases as it goes from the inlet of the fourth passage 62 to the outlet of the fourth passage 62 due to the latent heat of the vapor V2.

The first fluid L1 is provided to the heat absorbing surface 52 of the thermoelectric element 50 along the first fluid circulation passage 30, and is cooled by the heat absorbing surface 52. The cooled first fluid L1 is reintroduced into the second passage 12 of the first membrane distillation unit 10 along the first fluid circulation passage 30.

The second fluid L2 obtained by condensing the vapor V2 is temporarily stored in the second buffer tank 81 along the second fluid circulation passage 70. The fluid stored in the second buffer tank 81 is provided to the heat absorbing surface 52 of the thermoelectric element 50 along the second fluid circulation passage 70 by the second pump 82, and is cooled by the heat absorbing surface 52. The cooled second fluid L2 is reintroduced into the fourth passage 62 along the second fluid circulation passage 70. If the second fluid L2 corresponding to a predetermined amount or more is filled in the second buffer tank 81, a portion of the second fluid L2 is stored in the second fluid storage tank 83 along the supply line 84. If the second fluid L2 is fully filled in the second fluid storage tank 83, the user may evacuate the second fluid L2 by separating the second fluid storage tank 83.

In the above-mentioned process, the first fluid L1 circulates along the first fluid circulation passage 30, and the second fluid L2 circulates along the second fluid circulation passage 70. The amounts of the vapors V1 and V2 passing through the separators 13 and 63 of the first membrane distillation unit 10 and the second membrane distillation unit 60 increase as the difference between the partial pressures of the fluids flowing along the inner passages 11, 12, 61, and 62. According to an embodiment of the inventive concept, because the first fluid L1 is cooled by the heat absorbing surface 52 and is introduced into the second passage 12, the difference of the partial pressure from that of the external air a increases. Further, because the first fluid L1 is heated by the heat emitting surface 51 and is introduced into the third passage 61 and the second fluid L2 is cooled by the heat absorbing surface 52 and is introduced into the fourth passage 62, the difference between the partial pressures of the fluids L1 and L2 flowing through the second membrane distillation unit 60 increases.

Further, the heat generated by the heat emitting surface 51 of the thermoelectric element 50 is provided to heat the first fluid L1, emission of heat to the outside is prevented. This prevents shortening of the life span of a periphery device due to the generation of the heat.

A dehumidifying apparatus according to a second embodiment of the inventive concept will be described.

Figure 3:
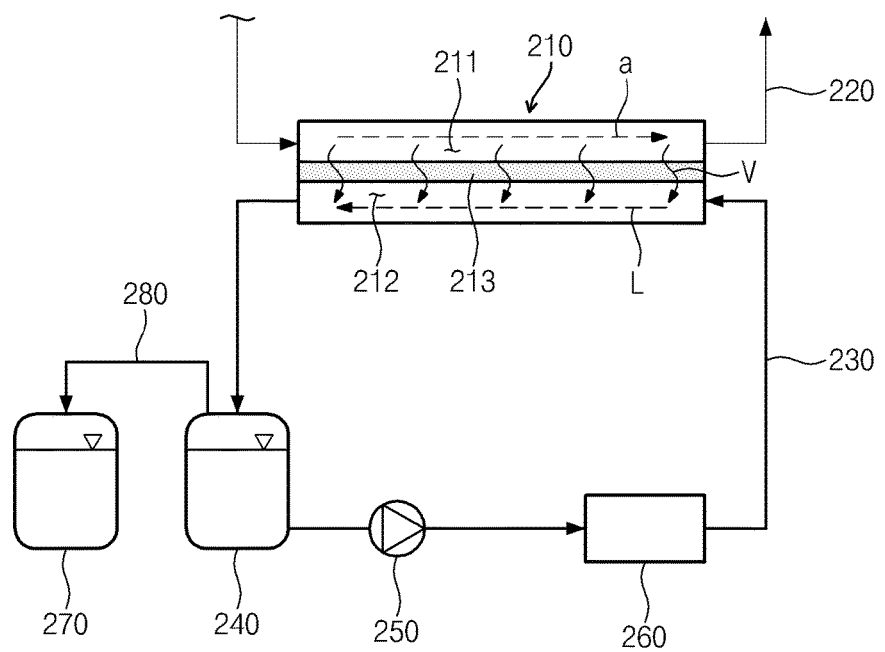
FIG. 3 is a view schematically illustrating a dehumidifying apparatus according to a second embodiment of the inventive concept.

FIG. 3 is a view illustrating a dehumidifying apparatus according to another embodiment of the inventive concept.

Referring to FIG. 3, the dehumidifying apparatus 200 includes a membrane distillation unit 210, an air passage 220, a fluid circulation passage 230, a buffer tank 240, a pump 250, a cooler 260, and a fluid storage tank 270.

The membrane distillation unit 210 separates and condenses vapor V contained in external air a. The membrane distillation unit 210 has the same structure as that of the first membrane distillation unit 10 of FIG. 1.

The air passage 220 is connected to the first passage 211 of the membrane distillation unit 210, and provides the external air a to the first passage 211. The air passage 220 has the same structure as that of the air passage 20 of FIG. 1.

The fluid circulation passage 230 is connected to the second passage 212 of the membrane distillation unit 210, and water L circulates through the fluid circulation passage 230. The water L is discharged from the second passage 212, and flows along the fluid circulation passage 230 and is introduced into the second passage 212 again.

The buffer tank 240, the pump 250, and the cooler 260 are sequentially provided on the fluid circulation passage 230 from the second passage 212 in a flow direction of the water L.

The buffer tank 240 is temporarily filled with the water L discharged from the second passage 212. The first pump 250 sends the water L filled in the buffer tank 240 to the cooler 260. The water L cooled by the cooler 260 is provided to the second passage 212 again. Because the difference between the partial pressures of the cooled water L and the external air a is large, the amount of the vapor V separated to the second passage 212 increases.

If the buffer tank 240 is filled with the water L corresponding to a predetermined amount or more, the water L flows to the fluid storage tank 270 through the supply line 280. If the fluid storage tank 270 is filled with the water, the user may evacuate the water by separating the fluid storage tank 270.

A dehumidifying apparatus according to a third embodiment of the inventive concept will be described.

Figure 4:
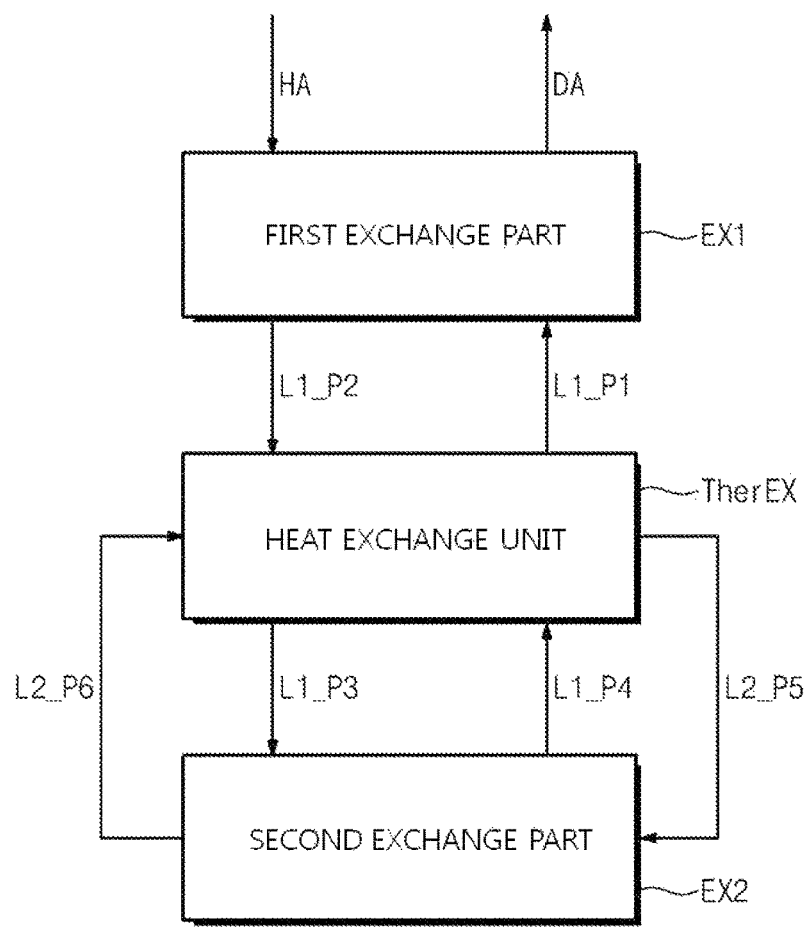
FIG. 4 is a block diagram illustrating the concept of a dehumidifying operation of a dehumidifying and humidifying apparatus according to a third embodiment of the inventive concept.

FIG. 4 is a block diagram illustrating the concept of a dehumidifying operation of a dehumidifying and humidifying apparatus according to a third embodiment of the inventive concept.

Referring to FIG. 4, the dehumidifying and humidifying apparatus according to the third embodiment of the inventive concept includes a first exchange part EX1, a second exchange EX2, and a heat exchange unit TherEX.

The wet air HA may be introduced from the outside to the first exchange part EX1. The first exchange part EX1 may receive a first fluid L1_P1 having a first partial pressure from the heat exchange unit TherEX. Due to the difference between the partial pressures of the first fluid L1_P1 having the first partial pressure and the wet air HA, the vapor may flow from the wet air HA to the first fluid L1_P1 having the first partial pressure. Accordingly, the wet air HA may be changed to dry air DA, and the first fluid L1_P1 having the first partial pressure may be changed to the first fluid L1_P2 having a second partial pressure that is higher than the first partial pressure.

The heat exchange unit TherEx receives the first fluid L1_P2 having the second partial pressure from the first exchange part EX1. The heat exchange unit TherEX may change the first fluid L1_P2 having the second partial pressure to the first fluid L1_P3 having a third partial pressure that is higher than the second partial pressure, and may supply the first fluid L1_P3 having the third partial pressure to the second heat exchange part EX2.

The second heat exchange part EX2 receives the second fluid L2_P5 having a fifth partial pressure from the heat exchange unit TherEX. Due to the difference between the partial pressures of the second fluid L2_P5 having the fifth partial pressure and the first fluid L1_P3 having the third partial pressure, vapor may flow from the first fluid L1_P3 having the third partial pressure to the second fluid L2_P5 having the fifth partial pressure. Accordingly, in the second exchange part EX2, the first fluid L1_P3 having the third partial pressure may be changed to the first fluid L1_P4 having a fourth partial pressure that is lower than the third partial pressure and be delivered to the heat exchange unit TherEX, and the second fluid L2_P5 having the fifth partial pressure is changed to the second fluid L2_P6 having a sixth partial pressure that is higher than the fifth partial pressure and be delivered to the heat exchange unit TherEX.

The heat exchange unit TherEX may change the first fluid L1_P4 having the fourth partial pressure to the first fluid L1_P1 having the first partial pressure that is lower than the fourth partial pressure and supply the first fluid L1_P1 to the first exchange part EX1, and may change the second fluid L2_P6 having the six partial pressure to the second fluid L12_P5 having the fifth partial pressure that is lower than the sixth partial pressure and supply the second fluid L2_P5 to the second exchange part EX2.

The dehumidifying and humidifying apparatus described with reference to FIG. 4 may perform a humidifying function. Hereinafter, this will be described with reference to FIG. 5.

Figure 5:
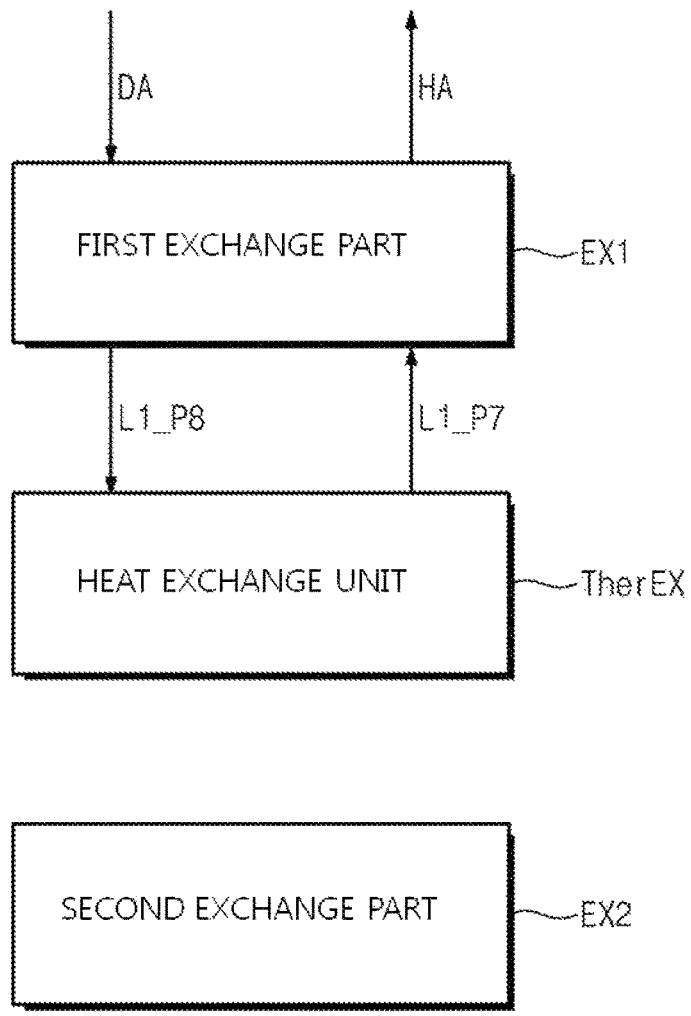
FIG. 5 is a block diagram illustrating the concept of a humidifying operation of the dehumidifying and humidifying apparatus according to the third embodiment of the inventive concept.

FIG. 5 is a block diagram illustrating the concept of a humidifying operation of the dehumidifying and humidifying apparatus according to the third embodiment of the inventive concept.

Referring to FIG. 5, dry air DA may be introduced from the outside to the first exchange part EX1. The first exchange part EX1 may receive a first fluid L1_P7 having a seventh partial pressure from the heat exchange unit TherEX.

Due to the difference between the partial pressures of the first fluid L1_P7 having the seventh partial pressure and the dry air DA, the vapor may flow from the first fluid L1_P7 having the seventh partial pressure to the dry air DA. Accordingly, the dry air DA may be changed to wet air HA, and the first fluid L1_P7 having the seventh partial pressure may be changed to the first fluid L1_P8 having an eighth partial pressure that is lower than the seventh partial pressure.

The heat exchange unit TherEx receives the first fluid L1_P8 having the eighth partial pressure from the first exchange part EX1. The heat exchange unit TherEX may change the first fluid L1_P8 having the eighth partial pressure to the first fluid L1_P7 having the seventh partial pressure that is higher than the eighth partial pressure, and may supply the first fluid L1_P7 having the seventh partial pressure to the first heat exchange part EX1.

When the humidifying and dehumidifying apparatus according to the embodiment of the inventive concept performs a humidifying function, the second exchange part EX 2 may not be operated.

The first exchange part EX1 and the second exchange part EX2 provided in the humidifying and dehumidifying apparatus according to the embodiment of the inventive concept may include a membrane evaporation unit, and the heat exchange unit TherEX may include a thermoelectric element. Hereinafter, this will be described with reference to FIG. 6.

Figure 6:
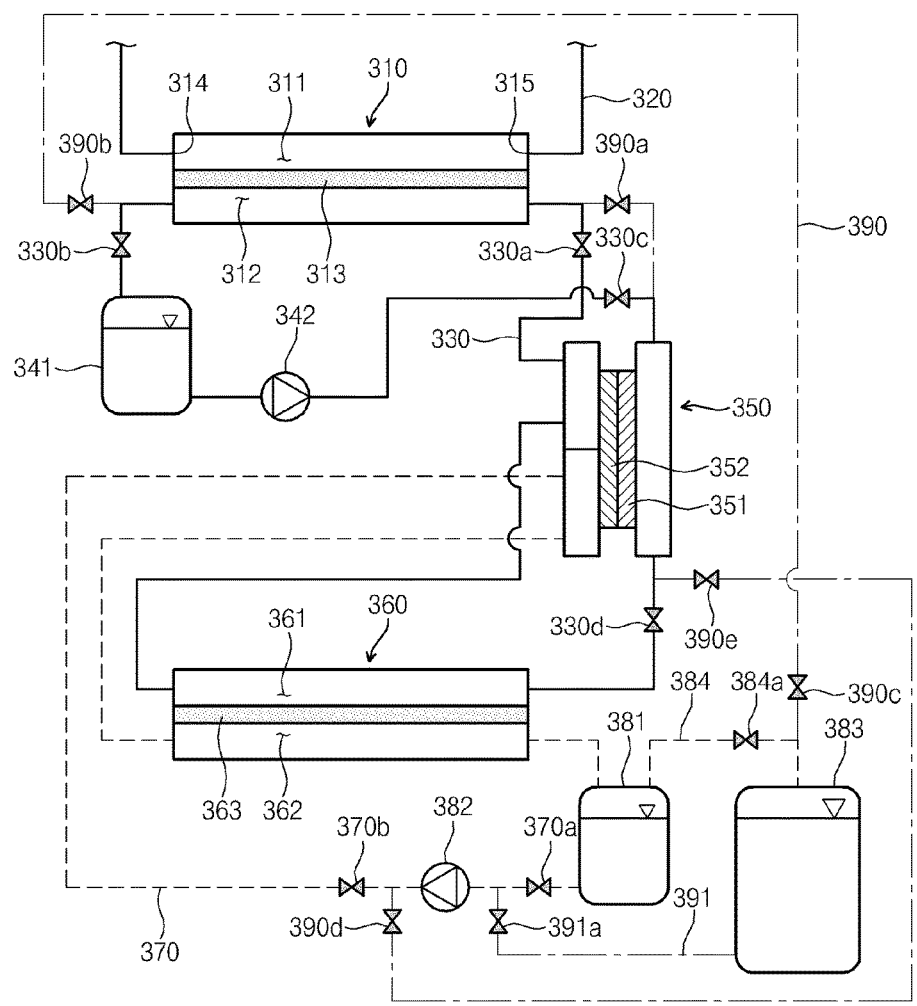
FIG. 6 is a view illustrating the dehumidifying and humidifying apparatus according to the third embodiment of the inventive concept.

FIG. 6 is a view illustrating the dehumidifying and humidifying apparatus according to the third embodiment of the inventive concept.

Referring to FIG. 6, the dehumidifying and humidifying apparatus 300 includes a first membrane distillation unit 310, an air passage 320, a first fluid circulation passage 330, a first buffer tank 341, a first pump 342, a thermoelectric element 350, a second membrane distillation unit 360, a second fluid circulation passage 370, a second buffer tank 381, a second pump 382, a fluid storage tank 383, and a third fluid circulation passage 390.

The first membrane distillation unit 310 separates and condenses vapor included in external air. The first membrane distillation unit 310 has a first passage 311, a second passage 312, and a first separator 313.

The first passage 311 is connected to the air passage 320. The external air introduced through the inlet 314 of the first passage 311 flows along the first passage 311, and is discharged through the outlet 15 of the first passage 311. For compulsory blowing of the external air, a pan or a pump (not illustrated) may be provided on the air passage 320.

When first fluid circulation passage valves 330a, 330b, 330c, and 330d are opened and third fluid circulation passage valves 390a, 390b, 390c, and 390d are closed, the second passage 312 is connected to the first fluid circulation passage 330 and the first fluid flows through the second passage 312.

In contrast, when third fluid circulation passage valves 390a, 390b, 390c, and 390d are opened and first fluid circulation passage valves 330a, 330b, 330c, and 330d are closed, the second passage 312 is connected to the third fluid circulation passage 390 and the third fluid flows through the third passage 390.

According to an embodiment, the first fluid and/or the third fluid may flow along the second passage 312 in a direction that is opposite to a flow direction of the external air in the first passage 311. Further, according to another embodiment, the first fluid and/or the third fluid may flow in a direction that is the same as the flow direction of the external air in the first passage 311. Further, according to another embodiment, the first fluid and/or the third fluid may flow in a direction that crosses the flow direction of the external air in the first passage 311.

The first fluid flowing through the second passage 312 may have a partial pressure that is lower than that of the external air flowing through the first passage 311. For example, the first fluid may include water containing a drying agent and/or may have a temperature that is lower than that of the external air flowing through the first passage 311. Accordingly, steam (for example, vapor) contained in the external air flowing through the first passage 311 may pass through the first separator 313 and may be absorbed by the first fluid flowing through the second passage 312. Accordingly, the external air may be dehumidified.

The drying agent contained in the first fluid is dissolved in water and a material that may absorb moisture is used as the drying agent. The drying agent may include an oxide such as calcium oxide (CaO) or phosphorus pentoxide ($P_2O_5$), an acid or a base such as concentrated sulfuric acid or sodium hydroxide, and a metal such as metallic sodium. According to an embodiment, lithium chloride (LiCl) is used as the drying agent. The drying agent is not limited thereto, but various materials having the above-mentioned properties may be used.

The third fluid flowing through the second passage 312 may have a partial pressure that is higher than that of the external air flowing through the first passage 311. Accordingly, steam (for example, vapor) contained in the first fluid flowing through the second passage 312 may pass through the first separator 313 and may be discharged to the external air flowing through the first passage 311. Accordingly, the external air may be humidified.

The first separator 313 is a porous hydrophobic membrane, and is divided into the first passage 311 and the second passage 312. The first separator 313 may include a polymeric membrane such as polytetrafluoroethylene (PTEE), polypropylene (PP), polyvinylidene fluoride (PVDF), and polyethylene (PE). According to an embodiment, the first separator 313 may be a single membrane. Further, according to another embodiment, the first separator 313 may be a multilayered membrane in which a hydrophobic membrane and a hydrophilic membrane are stacked. The first separator 313 included in the dehumidifying and humidifying apparatus 3300 according to the embodiment of the inventive concept is not limited in aspects of materials, types, and forms.

The first membrane distillation unit 310 may be any one of a plate and frame module, a hollow fiber module, a tubular membrane module, and a spiral wound membrane module. A passage of the plate and frame module is classified as a plate type separator. In the hollow fiber module, a plurality of very thin hollow fiber separators are provided in one cylindrical shell tube. In the tubular membrane module, a tubular separator is located between two inner and outer cylindrical chambers. The spiral wound membrane module is a module in which a flat sheet-shaped separator is wound by a spacer and a water collection pipe having a hole at the center thereof is produced.

The first fluid circulation passage 330 is a passage through which the first fluid circulates, and is connected to the second passage 312 of the first membrane distillation unit 310. The first buffer tank 341, the first pump 342, a heat emitting surface 351 of the thermoelectric element 350, a third passage 361 of the second membrane distillation unit 360, and a heat absorbing surface 352 of the thermoelectric element 350 may be provided on the first fluid circulation passage 330 from the second passage 312 in the flow direction of the first fluid.

The first buffer tank 341 is temporarily filled with the first fluid discharged from the second passage 312. The first pump 342 sends the first fluid filled in the first buffer tank 341 to the heat emitting surface 351 of the thermoelectric element 350. Because the first buffer tank 341 is always filled with the first fluid corresponding to a predetermined amount or more, generation of an overload of the first pump 342 is prevented.

The thermoelectric element 350 has the heat emitting surface 351 and the heat absorbing surface 352, and the heat emitting surface 351 and the heat absorbing surface 352 are connected to the first fluid circulation passage 330. The heat emitting surface 351 transfers heat to the first fluid discharged from the first buffer tank 341 and introduced to the third passage 361 of the second membrane distillation unit 360 to increase a temperature of the first fluid. Accordingly, the partial pressure of the first fluid may increase. The heat absorbing surface 352 absorbs heat from the first fluid discharged from the third passage 361 and introduced into the second passage 312 to decrease the temperature of the first fluid. Accordingly, the partial pressure of the first fluid may decrease.

The second membrane distillation unit 360 separates moisture from the first fluid. The second membrane distillation unit 360 has a third passage 361, a fourth passage 362, and a second separator 363. The second membrane distillation unit 360 may be a module that is the same as the above-described first membrane distillation unit 310.

The third passage 361 is connected to the first fluid circulation passage 330, and the fourth passage 362 is connected to the second fluid circulation passage 370. According to an embodiment, a flow of the first fluid in the third passage 361 and a flow of the second fluid in the fourth passage 362 may be opposite to each other. Further, according to another embodiment, a flow direction of the first fluid in the third passage 361 and a flow direction of the second fluid in the fourth passage 362 may be opposite to each other. Further, according to another embodiment, a flow direction of the first fluid in the third passage 361 and a flow direction of the second fluid in the fourth passage 362 may cross each other.

The second separator 363 is a porous hydrophobic membrane, and is divided into the third passage 361 and the fourth passage 362. The second separator 363 may be formed of the same material as that of the first separator 313 in the same form.

Moisture is evaporated from the first fluid flowing through the third passage 361 on a boundary surface of the second separator 363, and the generated vapor passes through the second separator 363 due to a difference of partial pressures, is separated to the fourth passage 362, and is condensed. According to an embodiment, the second fluid is water, and the condensed vapor is mixed with the second fluid.

The second fluid circulation passage 370 is a passage through which the second fluid circulates, and is connected to the fourth passage 362 of the second membrane distillation unit 360. The second buffer tank 381, the second pump 382, and the heat absorbing surface 352 of the thermoelectric element 350 are sequentially provided on the second fluid circulation passage 370 from the fourth passage 362 in the flow direction of the second fluid.

The second buffer tank 381 is temporarily filled with the second fluid discharged from the fourth passage 362. The second pump 382 sends the second fluid filled in the second buffer tank 381 to the heat emitting surface 352 of the thermoelectric element 350. Because the second buffer tank 381 is always filled with the second fluid corresponding to a predetermined amount or more, generation of an overload of the second pump 382 is prevented. If the second fluid corresponding to a predetermined level or more is filled in the second buffer tank 381, the second fluid is fed through the first supply line 384 and is delivered to the second fluid storage tank 383.

The third fluid circulation passage 390 is a passage through which the third fluid circulates, and is connected to the second passage 312 of the first membrane distillation unit 310. The fluid storage tank 383, the second pump 382, and the heat emitting surface 351 of the thermoelectric element 350 are sequentially provided on the third fluid circulation passage 390 from the second passage 312 in the flow direction of the third fluid.

The third fluid sent to the second passage 312 is stored in the fluid storage tank 383, and is delivered to the heat emitting surface 351 of the thermoelectric element 350 through the second supply line 391 and the second pump 382.

Hereinafter, a dehumidifying operation of the dehumidifying and humidifying apparatus according to the third embodiment of the inventive concept will be described.

Figure 7:
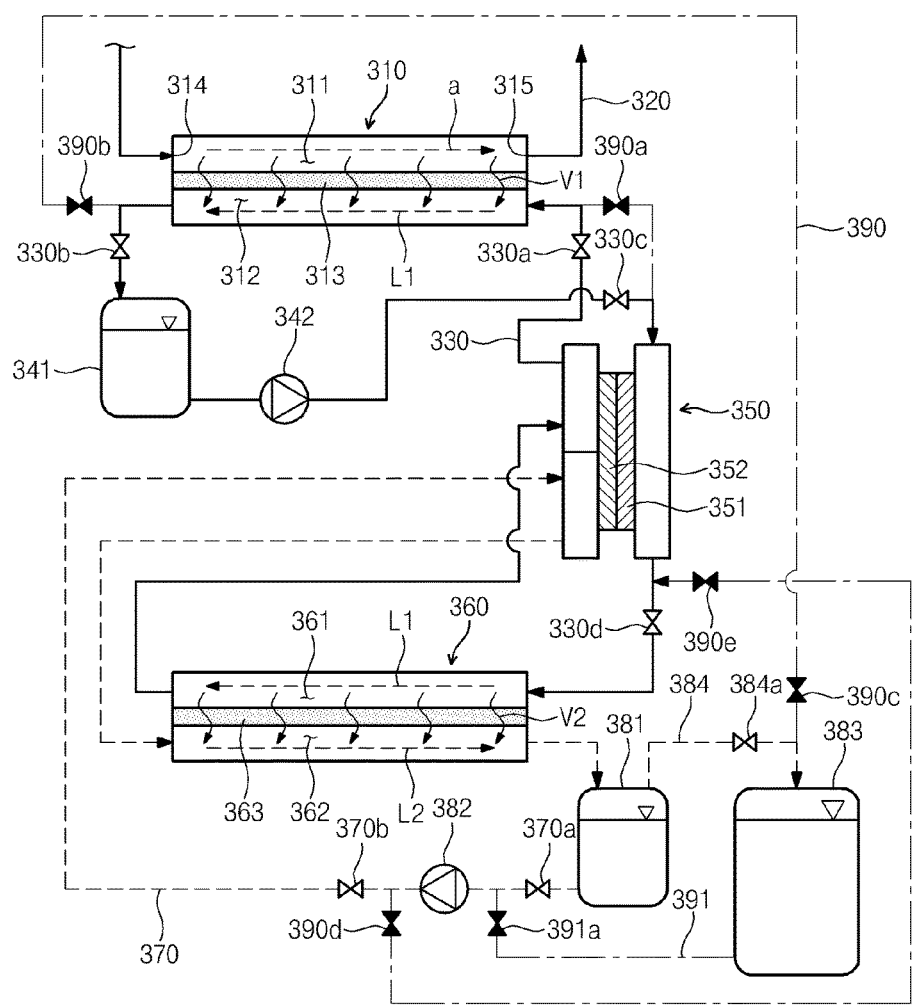
FIG. 7 is a view illustrating a dehumidifying operation of the dehumidifying and humidifying apparatus of FIG. 6.

FIG. 7 is a view illustrating a dehumidifying operation of the dehumidifying and humidifying apparatus of FIG. 6. As described with reference to FIG. 6, the directions in which the external air and the fluids flow may be opposite to each other, be the same, or cross each other.

Referring to FIG. 7, wet external air a is introduced into the first passage 311 of the first membrane distillation unit 310 through the air passage 320 through driving of the pan or the pump (not illustrated).

The first fluid circulation passage valves 330a, 330b, 330c, and 330d, the second fluid circulation passage valves 370a and 370b, and the first supply line valve 384a are opened, and the third fluid circulation passage valves 390a, 390b, 390c, and 390d and the second supply line valve 391a are closed. Accordingly, the first fluid L1 is introduced into the second passage 312. The partial pressure of the first fluid L1 is lower than the partial pressure of the external air a. Accordingly, in a process in which the external air a flows through the first passage 311, the vapor V1 contained in the external air a passes through the pores of the first separator 313 and is absorbed to the first fluid L1 of the second passage 312. In this case, as a difference between the partial pressures of the exterior air a and the first fluid L1 increases, an amount of the vapor V1 separated to the second passage 312 may increase. After the vapor V1 is removed, the external air a is discharged to the outside through the air passage 320.

The vapor V1 is condensed by the first fluid L1 flowing along the second passage 312. The vapor V1 is mixed with the first fluid L1, and the temperature of the first fluid L1 may gradually increase due to the latent heat of the vapor V1 as it goes from the inlet of the second passage 312 towards the outlet of the second passage 312. Accordingly, the partial pressure of the first fluid L1 may increase.

The first fluid L1 flows along the first fluid circulation passage 330 and is temporarily stored in the first buffer tank 341, and flows to the heat emitting surface 351 of the thermoelectric element 350 through driving of the first pump 342. The temperature of the first fluid L1 is increased by the heat emitting surface 351 of the thermoelectric element 350. Accordingly, the partial pressure of the first fluid L1 may increase.

The first fluid L1 is introduced into the third passage 361 of the second membrane distillation unit 360 along the first fluid circulation passage 330, and flows from the inlet of the third passage 361 to the outlet of the third passage 361. The second fluid L2 flows from the inlet of the fourth passage 362 to the outlet of the fourth passage 362. The temperature of the second fluid L2 introduced from the heat emitting surface 352 of the thermoelectric element 350 to the fourth passage 362 may be lower than the temperature of the first fluid L1 introduced from the heat emitting surface 351 of the thermoelectric element 350 to the third passage 361. Accordingly, the partial pressure of the first fluid L1 may be higher than the partial pressure of the second fluid L2. Due to the difference between the partial pressures of the first fluid L1 and the second fluid L2, the vapor V2 contained in the first fluid L1 passes through the second separator 363, is separated to the fourth passage 362, and is condensed by the second fluid L2. The temperature of the first fluid L1 gradually decreases as it goes from the inlet of the third passage 361 to the outlet of the third passage 361 due to loss of heat caused by flows of the vapor V2, and the temperature of the second fluid L2 gradually increases as it goes from the inlet of the fourth passage 362 to the outlet of the fourth passage 362 due to the latent heat of the vapor V2. Accordingly, the partial pressure of the first fluid L1 may decrease, and the partial pressure of the second fluid L2 may increase.

The first fluid L1 is provided to the heat absorbing surface 352 of the thermoelectric element 350 along the first fluid circulation passage 330, and is cooled by the heat absorbing surface 352. Accordingly, the partial pressure of the first fluid L1 may decrease. The first fluid L1, of which the partial pressure has been reduced, is reintroduced into the second passage 312 of the first membrane distillation unit 310 along the first fluid circulation passage 330.

The second fluid L2 obtained by condensing the vapor V2 is temporarily stored in the second buffer tank 381 along the second fluid circulation passage 370. The second fluid stored in the second buffer tank 381 is provided to the heat absorbing surface 352 of the thermoelectric element 350 along the second fluid circulation passage 370 by the second pump 382, and is cooled by the heat absorbing surface 352. Accordingly, the partial pressure of the second fluid L2 may decrease. The second fluid L2, of which the partial pressure has been reduced, is reintroduced into the fourth passage 362 along the second fluid circulation passage 370. If the second fluid L2 corresponding to a predetermined amount or more is filled in the second buffer tank 381, a portion of the second fluid L2 is stored in the second fluid storage tank 383 along the first supply line 384. If the second fluid L2 is fully filled in the second fluid storage tank 383, the user may evacuate the second fluid L2 by separating the second fluid storage tank 383.

In the above-mentioned process, the first fluid L1 circulates along the first fluid circulation passage 330, and the second fluid L2 circulates along the second fluid circulation passage 370. The amounts of the vapors V1 and V2 passing through the separators 313 and 363 of the first membrane distillation unit 310 and the second membrane distillation unit 360 increase as the difference between the partial pressures of the fluids flowing along the inner passages 311, 312, 361, and 362 becomes larger. According to an embodiment of the inventive concept, because the first fluid L1 is cooled by the heat absorbing surface 352 and is introduced into the second passage 312, the difference of the partial pressure from that of the external air a increases. Further, because the first fluid L1 is heated by the heat emitting surface 351 and is introduced into the third passage 361 and the second fluid L2 is cooled by the heat absorbing surface 352 and is introduced into the fourth passage 362, the difference between the partial pressures of the fluids L1 and L2 flowing through the second membrane distillation unit 360 increases. Accordingly, the difference between the partial pressures of the external air a and the first fluid L1 in the first membrane distillation unit 310 and the difference between the partial pressures of the first fluid L1 and the second fluid L2 in the second membrane distillation unit 320 may be efficiently secured, and thus dehumidifying efficiency may be improved.

Further, the heat generated by the heat emitting surface 351 of the thermoelectric element 350 is provided to heat the first fluid L1, emission of heat to the outside is prevented. This may prevent the life span of a peripheral device from being shortened due to generation of heat and may maintain the comfortability of the air conditioning space.

Hereinafter, a humidifying operation of the dehumidifying and humidifying apparatus according to the third embodiment of the inventive concept will be described.

Figure 8:
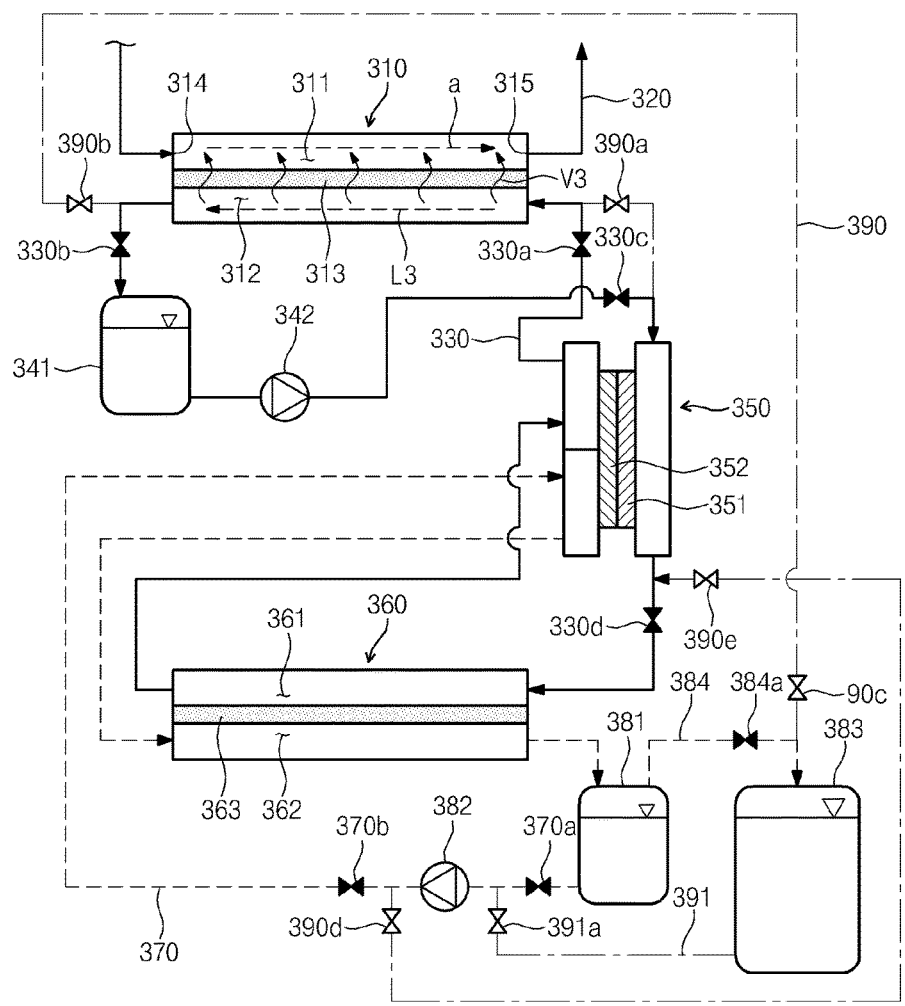
FIG. 8 is a view illustrating a humidifying operation of the dehumidifying and humidifying apparatus of FIG. 6.

FIG. 8 is a view illustrating a humidifying operation of the dehumidifying and humidifying apparatus of FIG. 3. As described with reference to FIG. 6, the directions in which the external air and the fluids flow may be opposite to each other, be the same, or cross each other.

Referring to FIG. 8, dry external air a is introduced into the first passage 311 of the first membrane distillation unit 310 through the air passage 320 through driving of the pan or the pump (not illustrated).

The third fluid circulation passage valves 390a, 390b, 390c, and 390d and the second supply line valve 391a are opened, and the first fluid circulation passage valves 330a, 330b, 330c, and 330d, the second fluid circulation passage valves 370a and 370b, and the first supply line valve 384a are closed. Accordingly, the third fluid L3 is introduced into the second passage 312.

The partial pressure of the third fluid L3 is higher than the partial pressure of the external air a. Accordingly, in a process in which the external air a flows through the first passage 311, the vapor V1 contained in the third fluid L3 passes through the pores of the first separator 313 and is absorbed to the external air a of the first passage 311. Due to the flow of the vapor V1, the partial pressure of the third fluid L3 decreases. In this case, as a difference between the partial pressures of the exterior air a and the third fluid L3 increases, an amount of the vapor V1 separated to the first passage 311 may increase. The external air a containing the vapor V1 is discharged to the outside through the air passage 320.

The third fluid L3 flows along the third fluid circulation passage 390, and is stored in the fluid storage tank 383. The third fluid L3 stored in the fluid storage tank 383 is introduced into the heat emitting surface 351 of the thermoelectric element 350 along the second supply line 391, by the second pump 382. The temperature of the third fluid L3 is increased by the heat emitting surface 351 of the thermoelectric element 350. Accordingly, the partial pressure of the third fluid L3 may increase. The third fluid L3, of which the partial pressure has been increased, is reintroduced into the second passage 312 of the first membrane distillation unit 310.

A dehumidifying and humidifying apparatus according to a fourth embodiment of the inventive concept will be described.

Unlike the third embodiment of the inventive concept, according to the fourth embodiment of the inventive concept, the dehumidifying and humidifying apparatus may further include a third membrane distillation unit and may perform dehumidifying and humidifying operations at the same time. Hereinafter, this will be described with reference to FIGS. 9 and 10.

Figure 9:
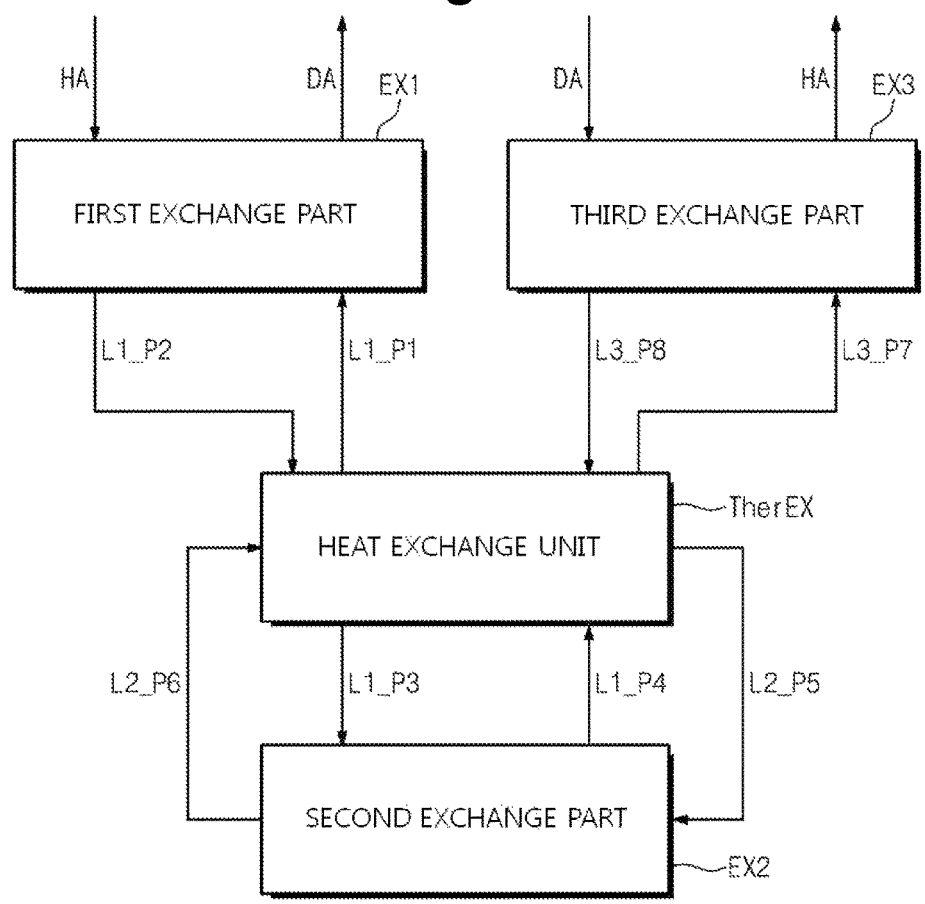
FIG. 9 is a block diagram illustrating the concept of a dehumidifying and humidifying apparatus according to a fourth embodiment of the inventive concept.

FIG. 9 is a block diagram illustrating the concept of a dehumidifying and humidifying apparatus according to a fourth embodiment of the inventive concept.

Referring to FIG. 9, a third exchange part EX3 is further provided in addition to the first exchange part EX1, the heat exchange unit TherEx, and the second exchange part EX2, which have been described with reference to FIG. 4. By the first exchange part EX1, the heat exchange unit TherEX, and the second exchange part EX2, a dehumidifying operation may be performed as described with reference to FIG. 4.

The dry air DA may be introduced from the outside to the third exchange part EX3. The third exchange part EX3 may receive a third fluid L3_P7 having a seventh partial pressure from the heat exchange unit TherEX.

Due to the difference between the partial pressures of the third fluid L3_P7 having the seventh partial pressure and the dry air DA, the vapor may flow from the third fluid L3_P7 having the seventh partial pressure to the dry air DA. Accordingly, the dry air DA may be changed to wet air HA, and the third fluid L3_P7 having the seventh partial pressure may be changed to the third fluid L3_P8 having an eighth partial pressure that is lower than the seventh partial pressure.

The heat exchange unit TherEx receives the third fluid L3_P8 having the eighth partial pressure from the third exchange part EX3. The heat exchange unit TherEX may change the third fluid L3_P8 having the eighth partial pressure to the third fluid L3_P7 having the seventh partial pressure that is higher than the eighth partial pressure, and may supply the first fluid L3_P7 having the seventh partial pressure to the third heat exchange part EX3.

Accordingly, the external air is dehumidified in the first exchange part EX1, and the external air is humidified in the third exchange part EX3. The first exchange part EX1 and the third exchange part EX3 may be disposed in different spaces.

Figure 10:
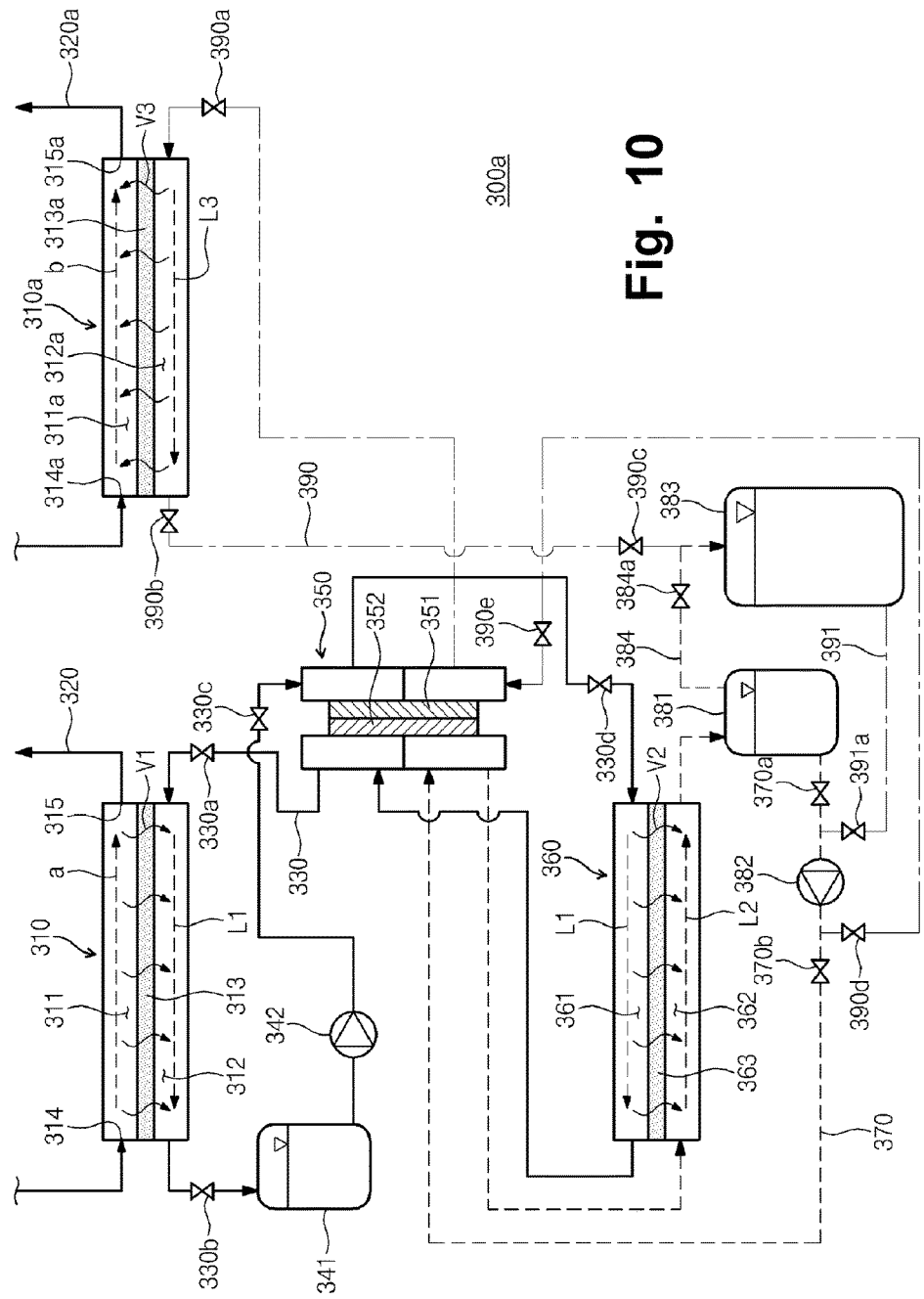
FIG. 10 is a view illustrating a dehumidifying and humidifying operation of the dehumidifying and humidifying apparatus according to the fourth embodiment of the inventive concept.

FIG. 10 is a view illustrating a dehumidifying and humidifying operation of the dehumidifying and humidifying apparatus according to the fourth embodiment of the inventive concept.

Referring to FIG. 10, the dehumidifying and humidifying apparatus 300 according to the fourth embodiment of the inventive concept may further include a third membrane distillation unit 310a, in addition to the first membrane distillation unit 310, the air passage 320, the first fluid circulation passage 330, the first buffer tank 341, the first pump 342, the thermoelectric element 350, the second membrane distillation unit 360, the second fluid circulation passage 370, the second buffer tank 381, the second pump 382, the fluid storage tank 383, and the third fluid circulation passage 390, which have been described with reference to FIG. 3.

As described with reference to FIG. 7, the first fluid L1 circulates the first membrane distillation unit 310, the thermoelectric element 350, and the second membrane distillation unit 360, and the external air a may be dehumidified in the first membrane distillation unit 310.

The third membrane distillation unit 310a includes a fifth passage 311a through which the external air is introduced, a sixth passage 312a connected to the third fluid circulation passage 390, and a third separator 313a partitioning the fifth and sixth passages 311a and 312a.

The third fluid L3 is introduced into the sixth passage 312a, and the dry external air b is introduced into the fifth passage 311a. The partial pressure of the third fluid L3 is higher than the partial pressure of the external air b. Accordingly, the vapor V3 contained in the third fluid L3 may flow to the external air b, and the external air b may be humidified. Accordingly, the partial pressure of the third fluid L3 may decrease.

After the third fluid L3, which has been discharged from the third membrane distillation unit 310a and of which the partial pressure has been decreased, may pass through the fluid storage tank 383 and then the partial pressure of the third fluid L3 is increased on the heat emitting surface 351 of the thermal element 350, and it may be reintroduced into the sixth passage 312 of the membrane distillation unit 310a. In other words, the third fluid L3 circulates the third membrane distillation unit 310a and the thermoelectric device 350, and the external air b may be humidified in the third membrane distillation unit 310a.

Although the preferred embodiments of the inventive concept have been described in detail until now, the scope of the inventive concept is not limited to the embodiments and should be construed by the attached claims. Further, it should be understood that those skilled in the art to which the inventive concept pertains may variously correct and modify the inventive concept without departing from the scope of the inventive concept.

INDUSTRIAL APPLICABILITY

The dehumidifying and humidifying apparatus according to the embodiments of the inventive concept may be used for domestic or industrial purposes, and it is apparent to those skilled in the art that the technical spirit of the prevent invention may be utilized in various air conditioning apparatuses.

What is claimed is:

1. A dehumidifying apparatus comprising:
  a first membrane distillation unit having a separator partitioning a first passage through which introduced external air flows and a second passage through which a first fluid flows, wherein vapor contained in the external air passes through the first separator and is separated to the second passage;
  a second membrane distillation unit having a second separator partitioning a third passage through which the first fluid discharged from the second passage flows and a fourth passage through which a second fluid flows, wherein steam generated from the first fluid passes through the second separator and is separated to the fourth passage;
  a thermoelectric element having a heat absorbing surface and a heat emitting surface; and
  a first fluid circulation line through which the first fluid discharged from the second passage is introduced into the third passage via the heat emitting surface and through which the first fluid discharged from the third passage is reintroduced into the second passage via the heat absorbing surface.

2. The dehumidifying apparatus of claim 1, further comprising:
  a buffer tank installed in the first fluid circulation line in a zone between the second passage and the heat emitting surface; and
  a pump installed in the first fluid circulation line in a zone between the buffer tank and the heat emitting surface.

3. The dehumidifying apparatus of claim 2, further comprising:
  a second fluid circulation line through which the second fluid discharged from the fourth passage is reintroduced into the fourth passage via the heat absorbing surface;

a buffer tank provided on the second fluid circulation line in a zone between the fourth passage and the heat absorbing surface and configured to accommodate the second fluid discharged from the fourth passage; and a second fluid storage tank connected to the buffer tank through a supply line and configured to store the second fluid contained in the buffer tank.

4. The dehumidifying apparatus of claim 1, wherein the heat absorbing surface cools the first fluid introduced into the second passage, and the heat emitting surface heats the first fluid introduced into the third passage.

5. A dehumidifying method comprising:
passing vapor contained in external air through a first separator of a first membrane distillation unit such that the vapor is condensed in a first fluid;
introducing the first fluid discharged from the first membrane distillation unit into a second membrane distillation unit via a heat emitting surface of a thermoelectric element;
passing steam of the first fluid generated from a surface of a second separator of the second membrane distillation unit through the second separator such that the steam is condensed in a second fluid; and
reintroducing the first fluid discharged from the second membrane distillation unit into the first membrane distillation unit via a heat absorbing surface of the thermoelectric element.

6. The dehumidifying method of claim 5, wherein the first fluid is cooled by the heat absorbing surface of the thermoelectric element, and the first fluid is heated by the heat emitting surface of the thermoelectric element.

7. The dehumidifying method of claim 5, wherein a portion of the second fluid discharged from the second membrane distillation unit is reintroduced into the second membrane distillation unit after being cooled via the heat absorbing surface of the thermoelectric element, and the remaining portion of the second fluid discharged from the second membrane distillation unit is introduced into a second fluid storage tank.

8. A dehumidifying and humidifying apparatus comprising:
a first exchange part in which steam is exchanged between a first fluid and external air due to a difference between partial pressures of the first fluid and the external air;
a heat exchange unit configured to supply the first fluid having a first partial pressure to the first exchange part and receive the first fluid having a second partial pressure that is different from the first partial pressure from the first exchange part; and
a second exchange part configured to receive the first fluid having a third partial pressure that is higher than the second partial pressure from the heat exchange unit, and supply the first fluid having a fourth partial pressure that is lower than the third partial pressure to the heat exchange unit.

9. The dehumidifying and humidifying apparatus of claim 8, wherein the second partial pressure is higher than the first partial pressure and steam of the external air flows to the first fluid in the first exchange part.

10. The dehumidifying and humidifying apparatus of claim 8, wherein the heat exchange unit changes a partial pressure of the first fluid having the fourth partial pressure, which has been supplied from the second exchange part, to the first partial pressure that is lower than the fourth partial pressure, and supplies the first fluid having the first partial pressure to the first exchange part.

11. The dehumidifying and humidifying apparatus of claim 8, wherein the second exchange part exchanges steam between a second fluid having a fifth partial pressure that is lower than the third partial pressure supplied from the heat exchange unit and the first fluid having the third partial pressure, and supplies the second fluid having a sixth partial pressure that is higher than the fifth partial pressure to the heat exchange unit.

12. The dehumidifying and humidifying apparatus of claim 11, wherein the heat exchange unit changes a partial pressure of the second fluid having the sixth partial pressure, which has been supplied from the second exchange part, to the fifth partial pressure, and supplies the second fluid having the fifth partial pressure to the second exchange part.

13. The dehumidifying and humidifying apparatus of claim 8, further comprising:
a third exchange part in which steam is exchanged between a third fluid and the external air.

14. The dehumidifying and humidifying apparatus of claim 13, wherein the heat exchange unit supplies the third fluid having a seventh partial pressure to the third exchange part, and receives the third fluid having an eighth partial pressure that is lower than the seventh partial pressure from the third exchange part.

15. The dehumidifying and humidifying apparatus of claim 13, wherein the third exchange part is disposed in a space that is different from the first exchange part.

16. The dehumidifying and humidifying apparatus of claim 8, wherein the second partial pressure is lower than the first partial pressure and steam of the first fluid flows to the external air in the first exchange part.

17. The dehumidifying and humidifying apparatus of claim 8, wherein the first exchange part comprises a membrane distillation unit.

18. The dehumidifying and humidifying apparatus of claim 8, wherein the heat exchange unit adjusts a partial pressure of the first fluid by adjusting a temperature of the first fluid.

19. The dehumidifying and humidifying apparatus of claim 8, wherein the heat exchange unit comprises a thermoelectric element.

* * * * *